United States Patent [19]
Field

[11] 3,734,523
[45] May 22, 1973

[54] SLALOM SLED
[76] Inventor: Lars Field, P.O. Box 344, Fishers Island, N.Y. 06390
[22] Filed: Sept. 11, 1970
[21] Appl. No.: 71,516

[52] U.S. Cl. ..........................280/16, 188/8, 280/22
[51] Int. Cl. ............................................B62b 13/04
[58] Field of Search......................280/16, 21, 21 A, 280/22, 12 AB; 188/5, 8, 105, 128; 74/481

[56] References Cited
UNITED STATES PATENTS

| | | | |
|---|---|---|---|
| 2,532,887 | 12/1950 | Bor | 280/21 A |
| 1,463,853 | 8/1923 | Stocking et al. | 74/481 |
| 1,896,966 | 2/1933 | Mate et al. | 188/8 |
| 1,326,343 | 12/1919 | Hewston et al. | 188/5 |
| 2,953,036 | 9/1960 | Wendt | 74/481 X |

FOREIGN PATENTS OR APPLICATIONS

| | | | |
|---|---|---|---|
| 1,317,158 | 12/1962 | France | 280/12 AB |
| 72,634 | 10/1962 | Norway | 280/22 |
| 222,764 | 6/1910 | Germany | 188/8 |
| 55,651 | 2/1911 | Switzerland | 188/8 |
| 1,048,161 | 12/1958 | Germany | 74/481 |

*Primary Examiner*—Leo Friaglia
*Assistant Examiner*—Robert R. Song
*Attorney*—Natter, Wigman & Natter

[57] ABSTRACT

A sled including a platform body mounted on a chassis having parallel spaced runners. The sled is provided with a steering mechanism incorporating a rack and pinion drive for displacing the runners laterally to the path of travel for directional control. A brake system is also incorporated into the sled and is optionally operated by a hand lever or a foot lever mechanically linked to a brake member, the latter being adapted to contact the terrain surface and thereby retard the movement of the sled. The runners are suitable for traversing ice covered surfaces and other surface traversing means such as snow skis may be selectively attached to the runners for specific surfaces. The runners and skis have a curved design with a longitudinal keel and dependent parallel edges so as to reduce frictional drag and to improve the lateral stability of the sled.

5 Claims, 9 Drawing Figures

PATENTED MAY 22 1973
3,734,523
SHEET 1 OF 2
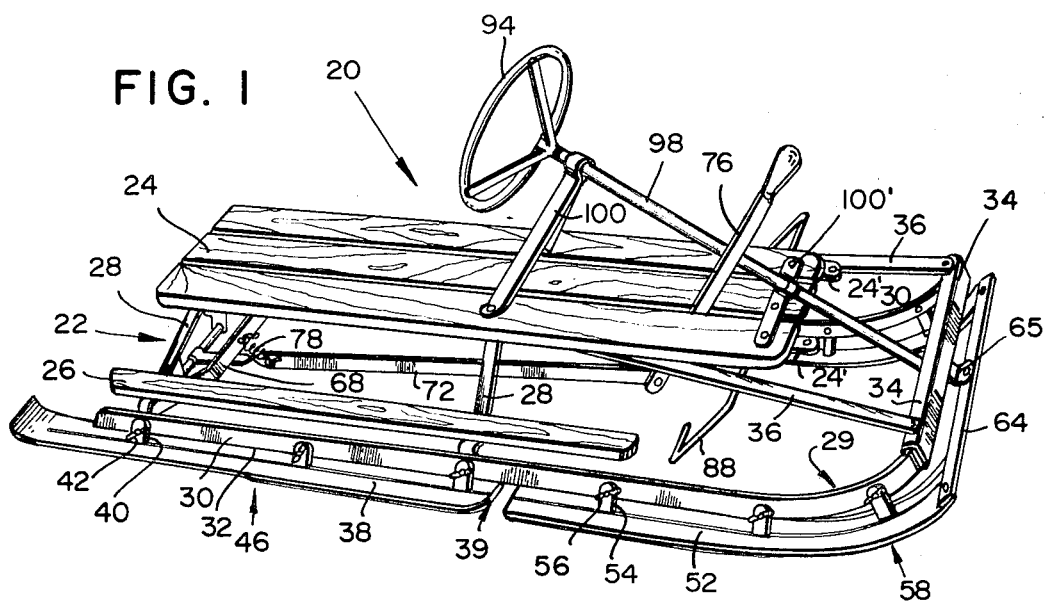
FIG. 1
FIG. 2
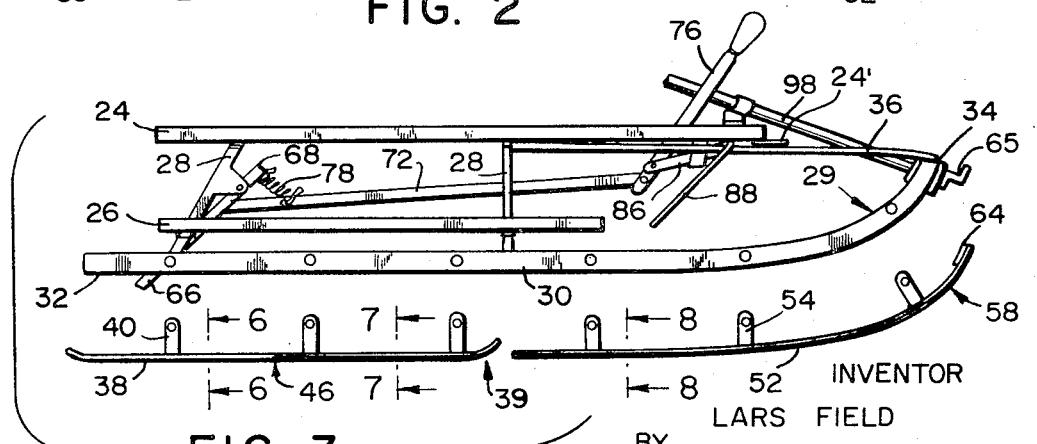
FIG. 3
INVENTOR
LARS FIELD
BY
Nattu, Wigman & Nattu
ATTORNEYS

PATENTED MAY 22 1973
3,734,523
SHEET 2 OF 2
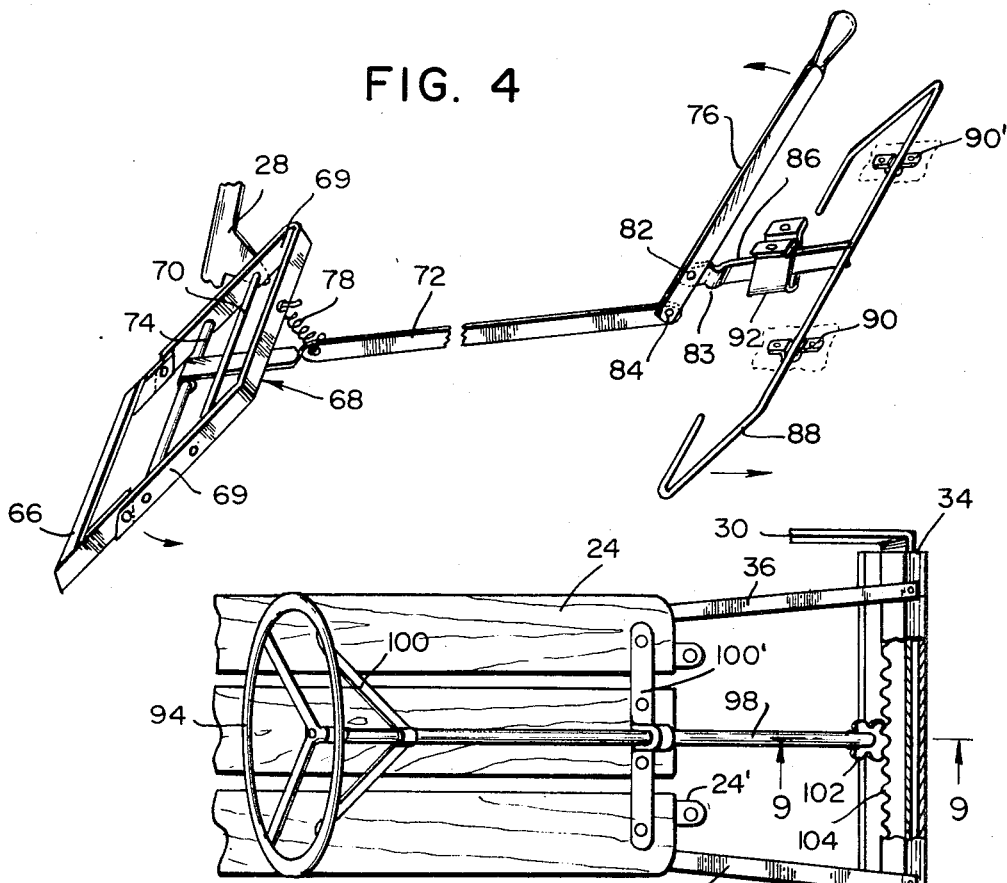
FIG. 4
FIG. 5
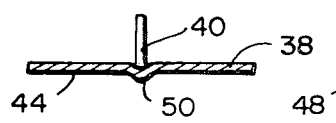
FIG. 6
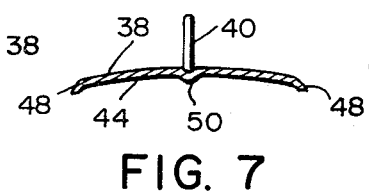
FIG. 7
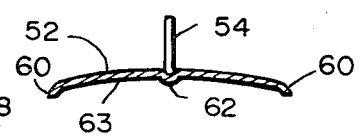
FIG. 8
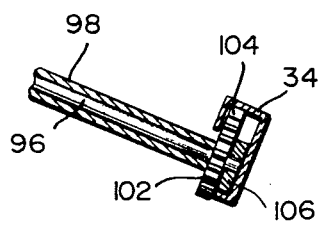
FIG. 9
INVENTOR
LARS FIELD
BY
*Nattu, Wigman & Nattu*
ATTORNEYS

SLALOM SLED

This device relates to a land vehicle and especially to a vehicle adapted for traversing over ice, snow, sand, grass or other specific terrain surfaces.

In particular the invention relates to a slalom sled suitable for coasting downhill over ice or snow in a winding or zigzag course and is equipped with means for controlling the direction and speed of the sled.

Winter sports provide a popular recreational pastime for young and old alike and is both an invigorating and healthful activity. One winter sport which has not achieved its full potential is that of sledding. The conventional sleds are made primarily for children, and in most cases must be used on gentle slopes because they lack effective braking systems and adequate steering apparatus for operation at higher speeds or on more steeply graded hills. Toboggans or narrow flat bottomed sleds lack maneuverability and control because they do not have runners, brakes, steering mechanisms, etc. and therefore have limited use. High speed bobsleds, on the other hand, are made for operation on special courses and it requires a great amount of practice for one to become proficient in the safe operation of these sleds.

Attempts to provide brake systems and steering mechanisms on conventional sleds have proved ineffectual and produced cumbersome and unbalanced sleds. One reason for this is that these prior art devices lacked properly designed flexible runner arrangements suitable for turning the sled yet capable of maintaining lateral stability. Other disadvantages of these prior devices included poor tracking over different surface conditions and resultant instability of the sled. Also, with the aforementioned sleds there was a tendency for the steering mechanism to "ice-up" or malfunction because of snow interferring with the operation. Furthermore, the runners or blades were permanently affixed to the sled and could not be interchanged with special traversing means, as in this invention, designed to suit the particular and specific terrain for providing more effective operation. Additionally, the previous sleds did not have the safety feature of an optional hand and foot controlled brake system.

Basically, the slalom sled of this invention is comprised of a chassis or frame supporting a plurality of slats or boards serving as a platform body. The chassis in turn is mounted on two spaced parallel runners having intermediate knee braces for stiffening the chassis and for providing a support for the body. The steering mechanism includes a journalled shaft having a pinion hear which engages a toothed bar or rack, said rack being located in a channel member positioned at the forward end of the sled. The channel member houses and partially encloses the rack and meshing pinion gear. Rotation of the shaft displaces the channel member and runners laterally of the chassis to steer the sled.

The brake system has a pivotally mounted brake member optionally operated by a hand or foot lever. The runners further include means for removably attaching additional traversing means for specific surfaces, such as snow skis, which encompass a curved forward steering ski which is split or separated from a rearward load bearing ski.

An important feature of this invention is the steering ski which improves the steering control. The design of both the steering and load bearing skis have depending parallel edges and a centrally positioned longitudinal keel for better tracking in snow. An additional feature of the sled is the rack and pinion steering mechanism which is protected from ice and snow for improved and trouble free performance. Another advantage and safety feature of the instant invention is the brake system optionally controlled by hand or foot lever.

This sled is therefore adequately adapted for widespread use by young and old alike and provides a sturdy relatively safe, easily operable vehicle, which as mentioned combines an independent hand and foot brake system with a steering mechanism affording great maneuverability to the sled. Furthermore, the attachable steering skis facilitate steering and provide versatility in operation.

Self-motivating means, such as a motor or sail arrangement may be attached to the sled to provide a propelling force and will be particularly useful when the sled is operated on a relatively horizontal surface such as an ice covered body of water. A hitch may also be provided so that the sled can be pulled over sand, grass, etc. as for example, by a dune buggy. It should also be evident that this glide vehicle or slalom sled may be modified, such as by substituting wheels for the skis and attaching same to the runners so as to be useful on other specific surfaces.

It is an object therefore of this invention to provide a slalom sled of the general character described herein which is particularly suitable for gliding over various types of running surfaces.

Specifically, it is an object of the instant invention to provide a slalom sled which has parallel spaced runners and also incorporates a steering mechanism and brake system.

Another object of this invention is to provide a slalom sled wherein traversing means, such as snow skis are removably attachable to the runners to permit operation over specific terrain surfaces.

A still further object of this invention is to provide a slalom sled having an independent hand and foot brake system for retarding the sled.

A further object of the present invention is to provide a slalom sled wherein the steering mechanism incorporates a rack and pinion drive.

Still another object of this invention is to provide a slalom sled wherein the runners have a curved design with parallel depending edges and a longitudinal keel to reduce frictional drag and to improve lateral stability.

Yet another object of this invention is to provide a slalom sled which is sturdy, relatively stable and safe to operate.

The above and other objects, features and advantages of the invention will be apparent from the following description of the preferred embodiment when considered in connection with the accompanying drawings.

In the accompanying drawings in which are shown some of the various embodiments of the invention:

FIG. 1 is a perspective view of the slalom sled of this invention shown with snow skis attached to corresponding runners;

FIG. 2 is a plan view of the sled showing with the use of phantom lines the position of the runners and skis when the sled is turning;

FIG. 3 is a side elevation view showing the snow skis detached from the runners;

FIG. 4 is an isolated perspective view to an enlarged scale of the brake system of this sled and shows in detail, a hand and a foot brake lever mechanically linked to a brake tie bar which is connected to a rotatable brake frame member;

FIG. 5 is an isolated perspective plan view of the steering mechanism of this invention with a portion of the sled broken away, and shows a pinion gear at one end of a steering shaft for engaging a rack located in a channel member, whereby rotation of the steering shaft will correspondingly displace the channel member with respect to the shaft and will turn the attached runners to effect sled movement in the desired direction;

FIG. 6 is a sectional view to an enlarged scale of the snow ski taken along line 6—6 in FIG. 3 and shows a generally flat load bearing surface having a centrally positioned longitudinal ridge or keel projecting from said surface;

FIG. 7 is a sectional view to an enlarged scale of the snow ski taken along line 7—7 of FIG. 3 and shows the snow ski and the depending parallel edges for lateral stability or tracking and additionally illustrates the centrally positioned longitudinal keel projecting from the ski surface;

FIG. 8 is a sectional view to an enlarged scale of a steering ski taken along line 8—8 of FIG. 3 and shows the snow ski having a pronounced upward curve at its forward end and includes depending parallel edges for tracking and a centrally positioned longitudinal keel projecting from the ski surface; and FIG. 9 is a partial sectional view to an enlarged scale taken along line 9—9 of FIG. 5 and shows in detail the rack and pinion steering mechanism wherein a pinion gear is affixed to the end of the steering shaft and further contains a roller bearing journalled on the shaft and positioned within the channel member for insuring positive engagement between the rack and pinion and for smooth movement between the shaft and channel member.

Referring now in detail to the drawings, the reference numeral 20 denotes generally the slalom sled of this invention. The sled 20 is comprised of a chassis or frame 22 which supports a platform body 24. The body 24 will carry one or more passengers and is preferably constructed from a plurality of slats or boards such as oak or other hard wood which has been varnished or otherwise treated to provide a smooth and weather resistant riding surface. For passenger comfort, a foot rest 26 is formed by placing additional boards on either side of the chassis 22 and slightly below the plane of the body 24. Additionally, two eyelet members 24' are affixed to the body 24 to provide a hitch for pulling the sled 20.

The frame 22 includes two knee braces 28 which lie transversely beneath and support the body 24; the frame 22 in turn is mounted on two parallel spaced runners 30. The knee braces 28 and the runners 30 are preferably made of cold rolled steel which has been welded or otherwise bolted together as an integral unit in the desired functional shape and the body 24 is firmly bolted or otherwise joined to the frame 22 to provide a sturdy and rigid sled. It should, of course, be noted that aluminum, wood, fiberglass, combinations of the aforementioned or other stock materials may be used in place of steel.

The runners 30 have a narrow edge 32 for contacting the terrain and are especially suited for traversing ice covered surfaces and for high speed racing. The forward end 29 of the runners 30 are curved upwardly as shown in FIGS. 1 and 3 and are joined by a transverse channel member 34 which houses elements of the steering mechanism. A harness member 36 having one end thereof affixed to a knee brace 28 and the other end thereof affixed to the channel member 34 provides additional support and rigidity to the channel member 34 and runners 30 and insures that they move in a unitary manner especially when the sled is turned.

A snow ski 38 is adapted for removable attachment to the rearward end of runner 30 by means of tabs 40 which are secured to the runners 30 by bolts and self-locking wing nuts 42. Other fastening arrangements may however be employed, e.g., nut and bolt, cotter and pin, etc. The snow ski 38 has a centrally positioned longitudinal ridge or keel 50 projecting from a generally flat load bearing surface 44 (see FIG. 6) and will sufficiently support the weight of the loaded sled 20. The ski 38 gradually passes through a transition at 46 to a cross sectional shape having depending parallel edges 48 (see FIG. 7) for improved lateral stability or tracking through snow. The centrally positioned longitudinal keel 50 projecting from the ski surface 44 extends for approximately the full length of ski 38 and provides added structural strength and lateral stability. The forward end 39 of ski 38 is curved upwardly so as to smoothly ride over the snow.

A separate steering snow ski 52 is provided for removable attachment to the forward portion 29 of the runner 30 and similarly is provided with tabs 54 and bolts with self-locking wing nuts 56 for attachment to the runners 30. The steering snow ski 52 has an upwardly curved portion 58 which generally follows the contour of the runner 30. The ski 52 also has depending parallel edges 60 for better tracking in snow and a centrally positioned longitudinal keel 62 protruding from a surface 63 for added structural strength. The keel 62 protrudes slightly further at the curved portion 58 of surface 63 for improved lateral stability of the sled 20. A bumper member 64, which joins the two snow steering skis 52 on opposite sides of the chassis 22 also serves as a protective guard and will further insure that the two skis 52 move as a unit when the sled 20 is turned. A bracket 65 may be employed to brace the bumper member 64.

The snow skis 38 and 52 are generally made of steel, however, they may be constructed from aluminum, wood, fiberglass, etc. or a composition material. Additionally, they can be covered along surfaces 44 and 63 with a friction reducing substance such as "Teflon", wax, or other protective coating. The skis 38 and 52 may also be modified by providing openings or windows (not shown) and by mounting small roller bearings therein to reduce friction when the sled 20 is moving over firm, or hard surfaces.

The brake system will now be more fully discussed with particular reference to FIG. 4 wherein an isolated perspective view is shown. A "U" shaped brake frame member 68 is rotatably mounted on a rod 70; the rod 70 is journalled through two depending legs 69 of the brake frame member 68 and has its opposed ends secured within one of the knee braces 28. A brake spring 78 is attached to the brake frame member 68 and to a brake tie bar 72 to firmly hold the brake frame member 68 in an idle position (as shown in FIG. 4). The brake tie bar 72 is secured by a pivotal pin connection 84 to a hand actuated lever 76 and by a brake frame crossbrace 74 to the brake frame member 68. The hand actuated lever 76 is also connected to a foot actuated lever 86 at a pivotal pin connection 82. A counterclockwise movement of the lever 76 about the pivotal pin connection 82 will displace the brake tie bar 72 and will cause a counterclockwise rotation of the brake frame member 68 against the force of spring 78. When the brake frame 68 moves to a generally vertical drag position, the ends of the legs 69, which are pointed, will dig into the terrain surface to retard the sled movement. This will be particularly effective in stopping the sled 20 when operating on runners 30 as on ice covered surfaces. When the sled 20 is being operated over snow covered surfaces and skis 38 and 52 are being used a brake shoe 66 is removably attached to the legs 69. The brake shoe 66 acts to slow the sled 20 as a result of the gradual build up of snow behind the brake shoe 66 when in a generally vertical drag position.

The brake tie bar 72 may optionally be moved and the brake shoe 66 or legs 69 brought into contact with the ground surface by means of the foot actuated brake lever 86. The foot brake lever 86 is rigidly connected to a stirrup member 88; the stirrup member 88 in turn is rotatably mounted to the body 24 by means of brackets 90'. A slotted guide member 92 is affixed to the body 24 in a depending fashion and the foot brake lever 86 is passed through the slotted guide 92 and attached to the hand brake lever 76 at pivotal pin connection 82. It should be noted at this point that a jog 83 or other bend protrusion or abutment is provided on lever 86 to check or restrain the movement of the lever 76 (in a clock-wise direction) about pin 82. A force exerted against the stirrup 88 and tending to rotate same in a counterclockwise direction will as indicated by the arrow in FIG. 4 will also angularly displace the foot brake lever 86 in a counterclockwise direction within the limits of guide 92 which also acts as a stop. The displacement of the foot brake lever 86, will move the pin connection 82 in the same direction. Since the hand brake lever is prevented from rotating in a clockwise direction by the abutting protrusion or bend 83, the lever 76 will move with connection 82 and will thus be displaced in a counterclockwise direction, as indicated by the arrow. This, in turn, will move the brake tie bar 72, with the resultant effect being a counterclockwise rotation of the brake frame member 68 as indicated by the arrow to bring it into a generally vertical drag position for contact with the terrain surface. It should thus be apparent that the brake system may be independently operated by the hand brake lever 76 or optionally by the stirrup 88 and foot brake lever 86.

The steering mechanism will now be discussed in greater detail. The directional control of the sled 20 is maintained by operation of a hand steering wheel 94. The steering wheel 94 is connected to a steering shaft 96 which is rotatably journalled within a sleeve member 98. The steering shaft 96 is angularly supported by means of steering shaft support brackets 100' which are mounted on the body 24 and adapted to hold the steering shaft 96 and wheel 94 at a preferred angle. The end of the steering shaft 96 is provided with a small gear wheel or pinion gear 102 which engages a toothed bar or rack 104 located within the channel member 34. The end of the steering shaft 96 is provided with a roller bearing 106 which is adapted to be firmly seated within the channel member 34 as shown in FIG. 9 to insure proper meshing between the pinion gear and rack, and to provide for smooth relative movement between the shaft 96 and channel member 34. The opposite ends of channel member 34 are further braced by means of harness member 36, said member 36 being flexible enough to move with the channel member 34 during displacement.

In operation, steering of the sled 20 is effectuated by turning the wheel 94 to rotate the steering shaft 96 and pinion gear 102 meshed within the rack 104. Since the steering shaft 96 is firmly affixed to the body 24, this rotation will result in a displacement of rack 104 and channel member 34 as the pinion gear 102 moves within channel member 34. The displacement of channel member 34 will, in turn, flex the attached runners 30, harness member 36 and steering blades 52 in the desired direction.

The steering mechanism will provide complete maneuverability for the sled 20. Furthermore, the channel member 34 provides a protective housing surrounding pinion gear 102 and rack 104 and will prevent the accumulation of ice or packed snow between the pinion gear 102 and rack 104 which would interfere with its operation. A roller bearing 106 is mounted within the channel member 34 to provide for smooth operation of the steering mechanism and will insure that steering shaft 96 is firmly mounted within the channel member 34 and that the pinion gear 102 is properly spaced from and positively engages the rack 104.

The above cited embodiment is intended as exemplary, and while it has described the invention with a specific implementation thereof, other modifications and various changes might be made in the embodiment as so set forth and will be apparent to those skilled in the art.

It should therefore be understood that all material described or shown in the accompanying drawings is to be interpreted as illustrative and not in a limiting sense.

Having thus described the invention, there is claimed as new and desired to be secured by Letters Patent:

1. A sled capable of navigating over various terrain surfaces with directional and speed control, said sled comprising a chassis, a sled body supported by said chassis, spaced parallel runners for supporting the sled in a traversing position, steering means for displacing a forward portion of the runners laterally relative to the sled body to change the sled traversing direction, brake means having alternate modes of operation for controlling sled speed, including a rotatably mounted brake frame member, biasing means for urging the brake frame member to an idle position free of the terrain surface, a pivotally attached hand brake lever, a brake tie bar mechanically linking the brake frame member and the hand brake lever to provide one mode of brake operation whereby pivotal movement of the hand brake lever acts to rotate the brake frame against the biasing means and into braking contact with the terrain surface, a foot engagable member rotatably secured to the sled, a foot brake lever interconnecting the foot engagable member and the hand brake lever, said foot brake lever including guide means for controlling the extent of movement of the foot brake lever, check means, said check means restricting rotation has been inserted therefor, same line, of the hand brake lever in one direction only whereby movement of the foot engagable member provides a second mode of brake operation, and displaces the hand brake lever to rotate the brake frame member against the biasing means and into braking contact with the terrain surface.

2. A sled as claimed in claim 1 wherein the check means comprises a protrusion on the foot brake lever for abutting contact with the hand brake lever.

3. A sled as claimed in claim 2, wherein the guide means includes a guide member for slidingly accommodating the foot brake lever and for defining one extent of its displacement.

4. A sled as claimed in claim 1, wherein the brake frame member includes speed retarding means having two spaced depending leg members, each of said leg members terminating in an acuminated end for penetrating engagement of the terrain surface.

5. A sled as claimed in claim 1, wherein the brake frame member includes speed retarding means having two spaced depending leg members and a brake shoe removably attachable to said leg members for frictional contact with the terrain surface.

* * * * *